United States Patent [19]

Novak et al.

[11] 3,927,567
[45] Dec. 23, 1975

[54] FLUID FLOW SENSING METHOD AND APPARATUS

[75] Inventors: Edward A. Novak, Downsview; George F. Paclik, Mississauga, both of Canada

[73] Assignee: The Garrett Corporation, Los Angeles, Calif.

[22] Filed: Aug. 16, 1974

[21] Appl. No.: 498,287

[52] U.S. Cl. .................................. 73/204; 138/37
[51] Int. Cl.² .................................. G01F 1/00
[58] Field of Search ............. 73/204, 272 R; 138/37

[56] References Cited
UNITED STATES PATENTS

| | | | |
|---|---|---|---|
| 3,147,618 | 9/1964 | Benson | 73/204 |
| 3,765,240 | 10/1973 | Haus | 73/204 |
| 3,798,967 | 3/1974 | Gieles | 73/204 |

Primary Examiner—Richard E. Aegerter
Assistant Examiner—A. Jason Mirabito
Attorney, Agent, or Firm—Alfons Valukonis; Albert J. Miller

[57] ABSTRACT

A fluid flow baffle for fluid flow sensing of the type wherein there is employed a sensor having a tubular body with openings exposing flow sensing elements contained therein to the fluid, and a heated tip member carrying another sensing element. The baffle has a cylindrical portion, an intermediate cone-shaped portion, and a ring portion at the convergent end of the cone-shaped portion. The baffle interconnects the tubular body and the heated tip member to reduce fluid flow disturbances and turbulence caused by the tubular body openings and alteration of the fluid flow pattern and velocities adjacent the heated tip member due to positioning changes of the sensor within the fluid.

2 Claims, 6 Drawing Figures

FLUID FLOW SENSING METHOD AND APPARATUS

BACKGROUND OF THE INVENTION

This invention relates generally to fluid flow sensing method and apparatus, and more particularly to fluid flow sensing method and apparatus of the type positionable in a fluid stream for measuring the cooling effect of the stream to provide mass flow rate information.

In utilizing flow sensors employing the cooling effect principle to measure flow velocity of fluids, it is necessary that the flow velocity adjacent the sensor be representative of the fluid flow velocity being measured in order to obtain accurate results. It is also required that the flow velocity patterns about the sensor remain constant even if the orientation of the sensor in the flow duct is changed. In other words, if the sensor is rotated in the duct from one position to another, measured flow should not change from the one position to the other.

Heretofore, externally heated flow sensors were provided which consisted of generally a tubular body, a resistive wire heating tip element at the end of the body, a thermistor bead positioned in the tip element to sense the heater element temperature, and a thermistor bead to measure the ambient fluid temperature. A third sensing bead element served to measure the ambient fluid temperature but was not part of the flow control and measurement function. The unheated beads were positioned in the tubular body of the sensor and a plurality of openings or windows were provided through the walls of the body to allow ample fluid whose flow is to be measured to circulate about the unheated beads. Investigation revealed that significant flow measurement variations resulted as the sensor probe orientation in the fluid was changed. This directional error was found to be due to fluid flow disturbance and turbulence caused by the windows altering the fluid flow pattern and velocities about the heating tip element which was located on the end of the tubular sensor body.

SUMMARY OF THE INVENTION

In accordance with the present invention, a fluid flow baffle means is provided which reduces fluid flow measurement errors resulting from flow disturbances and turbulence due to sensor construction and positioning changes within the fluid.

In the preferred embodiment of the invention there is provided fluid flow sensor apparatus of the type having a tubular body with openings exposing sensing elements to the fluid and a heated tip member with other sensing means therein, a fluid flow baffle member interconnecting the tubular body and the heated member which greatly reduces flow disturbances and turbulence in the fluid flow adjacent the heated tip member and maintains substantially constant and measured fluid flow velocity patterns even though positioning changes of the sensor within the fluid are made.

It will be seen that the fluid flow baffle of this invention is simple, light, compact, and is capable of substantially eliminating fluid flow measurement errors of sensors provided with such a baffle, as compared to prior sensor apparatus not so provided.

BRIEF DESCRIPTION OF THE DRAWINGS

For a more complete understanding of the invention, reference may be made to the accompanying drawings in which.

DETAILED DESCRIPTION OF THE PREFERRED EMBODIMENT

Figure 1:
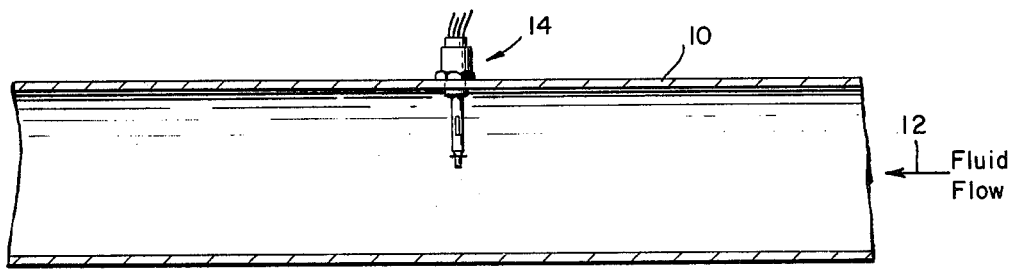
FIG. 1 illustrates schematically a fluid flow sensor of the type incorporating the present invention positioned in a conduit for measuring fluid flow.

Referring to FIG. 1, there is shown a fluid conduit 10 which could be connected to a source of fluid (not shown). The direction of fluid flow to be measured is indicated by the arrow 12. The flow sensor 14 incorporating the present invention is normally positioned in the conduit 10 at substantially right angles to the flow direction of the fluid.

Figure 2:
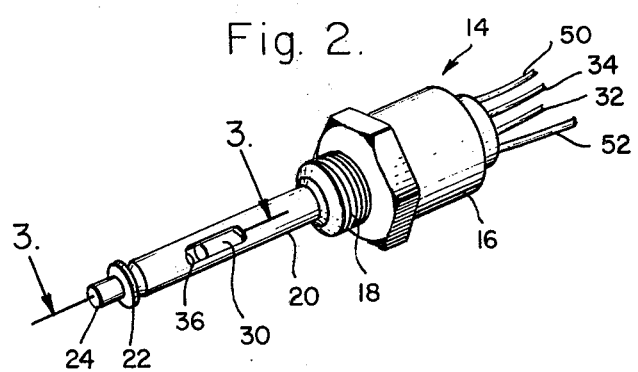
FIG. 2 is an enlarged perspective view of the flow sensor of FIG. 1.
Figure 3:
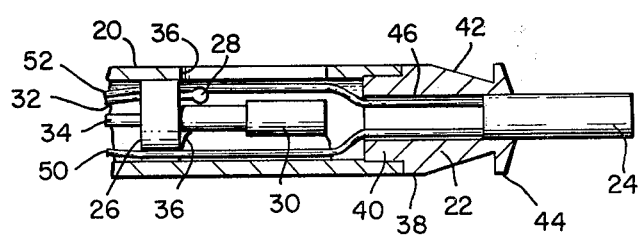
FIG. 3 is an enlarged cross-sectional view taken along the lines 3—3 of FIG. 2.
Figure 4:
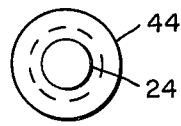
FIG. 4 is an enlarged end view of the sensor of FIG. 1.

Referring to FIGS. 2–4, the sensor 14 generally consists of a cylindrical housing member 16 with a threaded portion 18, for mounting in the fluid conduit 10, a stem 20, fluid flow baffle 22, and heating tip member 24.

Stem 20 is tubular in shape and carries positioned therein a cylindrical mounting member 26 fashioned preferably from Teflon, or the like. Member 26 supports a temperature sensing thermistor bead 28 as well as another thermistor bead (not shown), encapsulated in cylindrical member 30, which could be fashioned from aluminum, or the like. The thermistor bead (not shown) in member 30, is unheated and serves as one of the fluid flow sensing elements. Wire leads 32, 34 connect the beads to suitable flow measuring circuitry (not shown), which is conventional, and could take various forms, and therefore is not illustrated in detail, it not being part of the present invention. A plurality of openings, or windows 36, three in number, are provided the stem 20, which are evenly spaced around the circumference of the stem, and extend from the vicinity of bead 28 to the vicinity of encapsulated bead in member 30. Openings 36 serve to allow ample fluid flow within stem 20 primarily about the encapsulated bead when sensor 14 is positioned in a fluid stream.

Baffle 22 has a cylindrical end portion 38 with a reduced diameter portion 40 and is adapted for secured positioning within one end of stem 20. Provided also is an intermediate convergent cone-shaped portion 42 carrying a ring portion 44 at its convergent end. Portion 44 has a diameter substantially equal to the diameter of cylindrical portion 38. Baffle 22 is a single integral unit and can be fashioned from Teflon, or the like. A longitudinal bore 46 is provided through the portions 40, 42 and 44 of the baffle and serves to carry the heating tip 24 with its associated wiring.

Heating tip 24 is cylindrical in shape and carries encapsulated therein another sensing element in the form of a thermistor bead (not shown). Tip 24 can be fashioned from aluminum, or the like, and also carries heater wires (not shown) for heating the thermistor bead therein. Wires 50, 52 lead from the heater wires and thermistor bead to the flow measuring circuitry (not shown).

Figure 5:
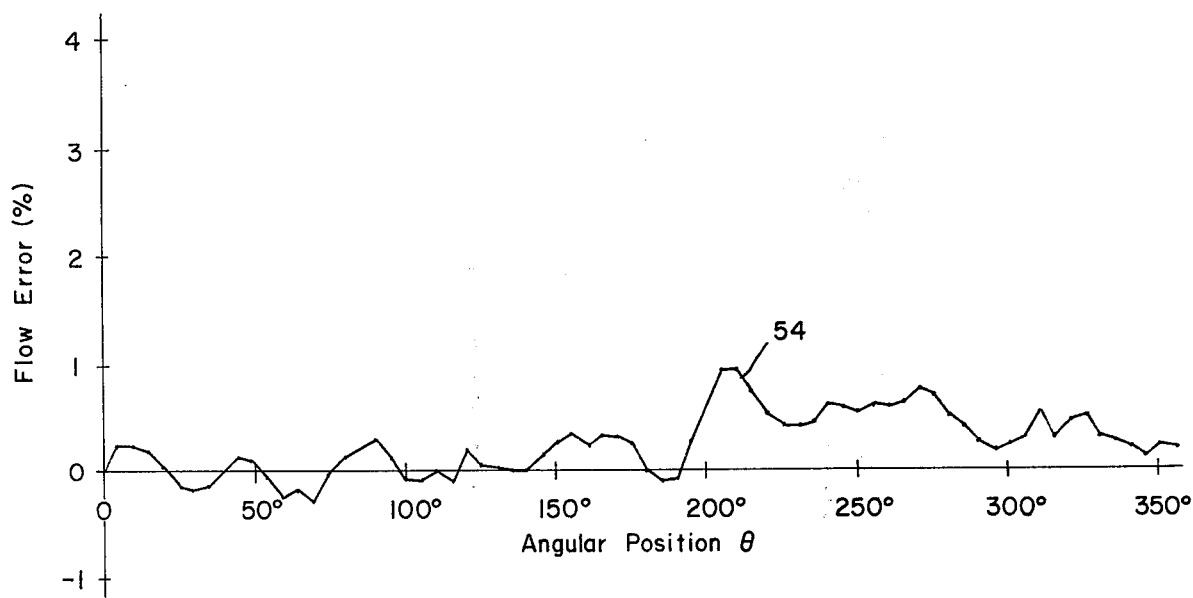
FIG. 5 is a graph helpful to the understanding of the present invention.
Figure 6:
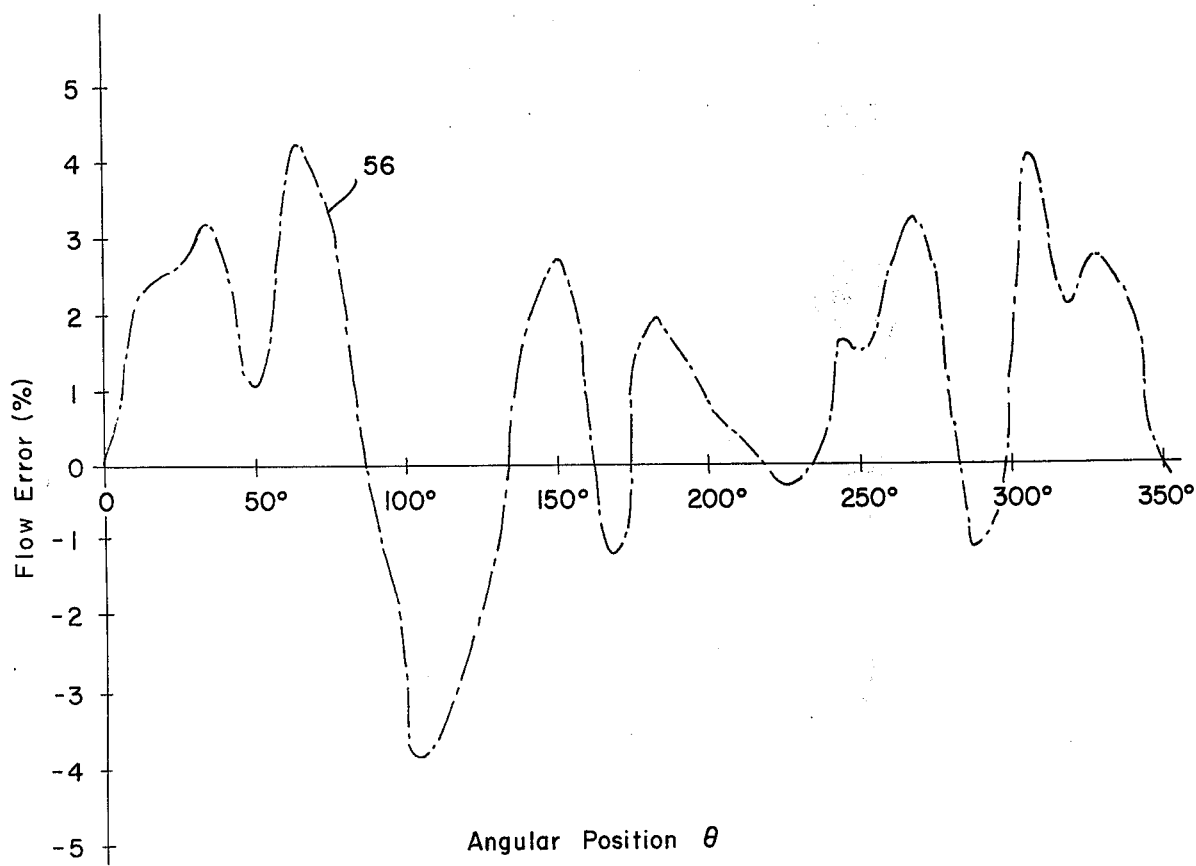
FIG. 6 is another graph also helpful to the understanding of the invention.

In operation, when the sensor 14 is positioned in the fluid stream, as shown in FIG. 1, the fluid flow patterns about the tip 24 are effectively isolated by the baffle 22 from the turbulence caused in the fluid by stem openings 36. Accordingly, even if the position of sensor 14 is changed by rotating it to new positions measured fluid flow errors are minimized and directionality of the sensor is substantially eliminated. Thus, for example, if sensor 14 is positioned in conduit 10, and a constant fluid flow and temperature is provided, a voltage output which is a measure of fluid flow can be generated by circuitry (not shown), connected to the sensing elements and heater wires (not shown), as is well known in the art. If now sensor 14 is rotated in 5° positions for about a total of 350°, and an output recorded for each position, an exemplary curve such as curve 54 of FIG. 5 can be obtained depicting less than ± 1 percent in flow error due to sensor rotation. This contrasts with curve 56 in FIG. 6, illustrating considerably greater flow error obtained with a sensor that is not provided with fluid flow baffle structure such as the baffle 22 of the present invention.

While a specific embodiment of the invention has been illustrated and described, it is to be understood that it is provided by way of example only, and that the invention is not to be construed as being limited thereto, but only by the scope of the following claims.

What we claim is:

1. A fluid flow sensor comprising:
   a generally tubular body exposed to a flow of fluid to be sensed;
   a heated sensing element disposed at one end of said generally tubular body and extending into the flow of fluid;
   an unheated sensing element disposed within said generally tubular body intermediate the ends thereof, said generally tubular body including at least one opening intermediate the ends thereof to permit the flow of fluid around said unheated sensing element; and
   baffle means disposed on said generally tubular body intermediate said at least one opening and said heated sensing element to substantially isolate said heated sensing element from fluid flow disturbances and turbulence resultant from the flow of fluid through said at least one opening in said generally tubular body.

2. In a fluid flow sensor of the type having a tubular body with openings for exposing sensing elements contained therein to the fluid, and a heated tip member carrying another sensing element, the improvement comprising:
   a fluid flow baffle means interconnecting the tubular body and heated tip member, said fluid flow baffle means being configured to reduce fluid flow disturbances and turbulence caused by the tubular body openings and alternation of the fluid flow pattern and velocities adjacent the heated member due to positioning of the sensor within the fluid,
   said fluid flow baffle means comprising:
   a cylindrical portion secured within one end of the tubular body;
   an intermediate cone-shaped portion; and
   a ring portion at the convergent end of said cone-shaped portion carrying the heated member;
   said portions having a longitudinal bore for accommodating the heated tip member.

* * * * *